(12) United States Patent
Feng et al.

(10) Patent No.: US 11,755,644 B2
(45) Date of Patent: Sep. 12, 2023

(54) VIDEO QUERY METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Yang Feng, Shenzhen (CN); Lin Ma, Shenzhen (CN); Wei Liu, Shenzhen (CN); Jiebo Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 195 days.

(21) Appl. No.: 17/333,001

(22) Filed: May 27, 2021

(65) Prior Publication Data

US 2021/0287006 A1    Sep. 16, 2021

Related U.S. Application Data

(63) Continuation of application No. PCT/CN2020/086670, filed on Apr. 24, 2020.

(30) Foreign Application Priority Data

Apr. 29, 2019    (CN) .......................... 201910355782.3

(51) Int. Cl.
*G06F 16/732* (2019.01)
*G06F 16/783* (2019.01)
(Continued)

(52) U.S. Cl.
CPC ...... *G06F 16/7328* (2019.01); *G06F 16/7837* (2019.01); *G06T 7/20* (2013.01);
(Continued)

(58) Field of Classification Search
CPC .. G06F 16/7328; G06F 16/7837; G06F 16/73; G06F 16/783; G06T 7/20;
(Continued)

(56) References Cited

U.S. PATENT DOCUMENTS

| 2018/0137892 | A1* | 5/2018 | Ding | G11B 27/031 |
| 2020/0134321 | A1* | 4/2020 | Chen | G06V 40/103 |
| 2020/0394416 | A1 | 12/2020 | Gong et al. | |

FOREIGN PATENT DOCUMENTS

| CN | 104239566 A | 12/2014 |
| CN | 106570165 A | 4/2017 |

(Continued)

OTHER PUBLICATIONS

The World Intellectual Property Organization (WIPO) International Search Report for PCT/CN2020/086670 dated Jul. 29, 2020 5 Pages (including translation).
Y. Feng et al., "Spatio-temporal Video Re-localization by Warp LSTM," In IEEE Conference on Computer Vision and Pattern Recognition, 2019, pp. 1288-1297. 10 pages.
S. Ren et al., "Faster R-CNN: Towards Real-Time Object Detection with Region Proposal Networks," In Advances in neural information processing systems, 2015. 9 pages.
(Continued)

*Primary Examiner* — Amara Abdi
(74) *Attorney, Agent, or Firm* — ANOVA LAW GROUP, PLLC

(57) ABSTRACT

A video query method includes obtaining a media feature of a query media and a static image feature corresponding to a candidate video. The query media includes the target object, and the candidate video includes the moving object. A video feature of the candidate video is determined according to the static image feature and motion time sequence information of the moving object in the candidate video. Whether the moving object in the candidate video is related to the target object in the query media can be determined according to the media feature and the video feature.

17 Claims, 7 Drawing Sheets

(51) Int. Cl.
*G06T 7/20* (2017.01)
*G06V 20/40* (2022.01)
*G06V 10/764* (2022.01)
*G06V 10/82* (2022.01)

(52) U.S. Cl.
CPC ............ *G06V 10/764* (2022.01); *G06V 10/82* (2022.01); *G06V 20/41* (2022.01); *G06V 20/46* (2022.01); *G06V 20/49* (2022.01); *G06T 2207/10016* (2013.01)

(58) Field of Classification Search
CPC ........ G06T 2207/10016; G06V 10/764; G06V 10/82; G06V 20/41; G06V 20/46; G06V 20/49; G06V 2201/07
See application file for complete search history.

(56) References Cited

FOREIGN PATENT DOCUMENTS

| CN | 07609513 | * | 1/2018 | ............... G06K 9/00 |
| CN | 107609513 A | | 1/2018 | |
| CN | 109086709 A | | 12/2018 | |
| CN | 110083742 A | | 8/2019 | |

OTHER PUBLICATIONS

J. Carreira et al., "Quo Vadis, Action Recognition? A New Model and the Kinetics Dataset," In proceedings of the IEEE Conference on Computer Vision and Pattern Recognition, 2017, pp. 6299-6308. 10 pages.

* cited by examiner

VIDEO QUERY METHOD, APPARATUS, AND DEVICE, AND STORAGE MEDIUM

CROSS-REFERENCES TO RELATED APPLICATIONS

This application is a continuation application of PCT Patent Application No. PCT/CN2020/086670, entitled "VIDEO QUERY METHOD, DEVICE, APPARATUS, AND STORAGE MEDIUM" and filed on Apr. 24, 2020, which claims priority to Chinese Patent Application No. 201910355782.3, entitled "VIDEO QUERY METHOD AND APPARATUS" and filed on Apr. 29, 2019, all of which are incorporated herein by reference in their entirety.

FIELD OF THE TECHNOLOGY

The present disclosure relates to the field of media processing, and in particular, to a video query method, apparatus, device, and a storage medium.

BACKGROUND OF THE DISCLOSURE

With the development of search query technologies, a user may use a media to query a video related to the media. The media includes pictures, audio, videos, and the like. For example, the user may query, among candidate videos and by using a query video that includes the target object, a target video including the target object.

In related art, a content-based video query technology is used to implement the foregoing service.

However, the foregoing video query technology is not accurate enough. During video query according to a media including a target object, when a candidate video includes the target object but the target object is in motion, the candidate video usually cannot be found.

SUMMARY

The present disclosure provides a video query method, apparatus, and device, and a storage medium, which can accurately determine whether a moving object in a candidate video is related to a target object in a query media according to a media feature and a video feature, thereby improving the query accuracy.

The following technical solutions are disclosed in embodiments of the present disclosure:

According to one aspect of the present disclosure, an embodiment of the present disclosure provides a video query method. The method includes: obtaining a media feature of a query media and a static image feature corresponding to a candidate video, the query media including a target object, the candidate video including a moving object; determining a video feature of the candidate video according to the static image feature and motion time sequence information of the moving object in the candidate video; and determining, according to the media feature and the video feature, whether the moving object in the candidate video is related to the target object.

According to another aspect of the present disclosure, an embodiment of the present disclosure provides a video query apparatus, the apparatus including: an obtaining unit, a first determining unit, and a second determining unit: the obtaining unit being configured to obtain a media feature of a query media and a static image feature corresponding to a candidate video, the query media including a target object, the candidate video including a moving object; the first determining unit being configured to determine a video feature of the candidate video according to the static image feature and motion time sequence information of the moving object in the candidate video; and the second determining unit being configured to determine, according to the media feature and the video feature, whether the moving object in the candidate video is related to the target object.

According to another aspect of the present disclosure, an embodiment of the present disclosure provides a video query device, including a processor and a memory: the memory being configured to store program code, and transmit the program code to the processor; and the processor being configured to execute the program code to perform: obtaining a media feature of a query media and a static image feature corresponding to a candidate video, the query media including a target object, the candidate video including a moving object; determining a video feature of the candidate video according to the static image feature and motion time sequence information of the moving object in the candidate video; and determining, according to the media feature and the video feature, whether the moving object in the candidate video is related to the target object.

According to another aspect of the present disclosure, an embodiment of the present disclosure provides a computer-readable storage medium, configured to store program code. The program code, when being executed by a processor, causes the processor to perform: obtaining a media feature of a query media and a static image feature corresponding to a candidate video, the query media including a target object, the candidate video including a moving object; determining a video feature of the candidate video according to the static image feature and motion time sequence information of the moving object in the candidate video; and determining, according to the media feature and the video feature, whether the moving object in the candidate video is related to the target object.

As can be seen from the foregoing technical solutions, the media feature of the query media and the static image feature corresponding to the candidate video are obtained. The query media includes the target object, and the candidate video includes the moving object. The video feature of the candidate video is determined according to the static image feature and the motion time sequence information of the moving object in the candidate video. Because information reflected by the moving object in motion can be accurately captured by using the motion time sequence information, the determined video feature can accurately describe the moving object, thereby effectively avoiding negative impact caused by the original moving object in the video query. Whether the moving object in the candidate video is related to the target object in the query media can be accurately determined according to the media feature and the video feature, thereby improving query experience of a user.

BRIEF DESCRIPTION OF THE DRAWINGS

To describe the technical solutions in the embodiments of the present disclosure or existing technologies more clearly, the following briefly describes the accompanying drawings required for describing the embodiments or existing technologies. Apparently, the accompanying drawings in the following description show only some embodiments of the present disclosure, and a person of ordinary skill in the art may derive other drawings from the accompanying drawings without creative efforts.

DESCRIPTION OF EMBODIMENTS

The following describes embodiments of the present disclosure with reference to accompanying drawings.

In video query, if a candidate video has a moving target object, a video feature of the candidate video obtained by using the conventional video query technology cannot accurately reflect actual content of the candidate video. In other words, it is difficult to accurately capture the moving object in the candidate video and reflect the moving object to the corresponding video feature. As a result, even if the target object is included in a query media for query, it is not easy to recognize that the candidate video is related to the query media, and therefore the accuracy of video query is low.

The embodiments of the present disclosure provide a video query method, which is based on motion time sequence information of a moving object in a candidate video during determining of a video feature of the candidate video, thereby effectively avoiding the recognition difficulty caused by the original moving object in the video query.

The video query method provided in the embodiments of the present disclosure is applicable to various video processing scenarios, for example, applicable to the recognition of characters in videos, tracking of objects by smart devices, tracking of characters by smart devices, and classification of video programs.

The video query method provided in the embodiments of the present disclosure is applicable to an electronic device with a media processing function. The electronic device may be a terminal device. The terminal device may be, for example, a smart terminal, a computer, a personal digital assistant (PDA), or a tablet computer.

The electronic device may alternatively be a server. The server provides media processing services to the terminal device. The terminal device may upload the query media to the server. The terminal device or other terminal devices may upload candidate video(s) to the server. By using the video query method provided in the embodiments of the present disclosure, the server determines whether the moving object in the candidate video is related to the target object in the query media, and returns a result to the terminal device. The server may be an independent server, or may be a server in a cluster.

For ease of understanding the technical solutions of the present disclosure, the video query method provided in the embodiments of the present disclosure is described below by using a terminal device as an example with reference to an actual application scenario.

Figure 1:
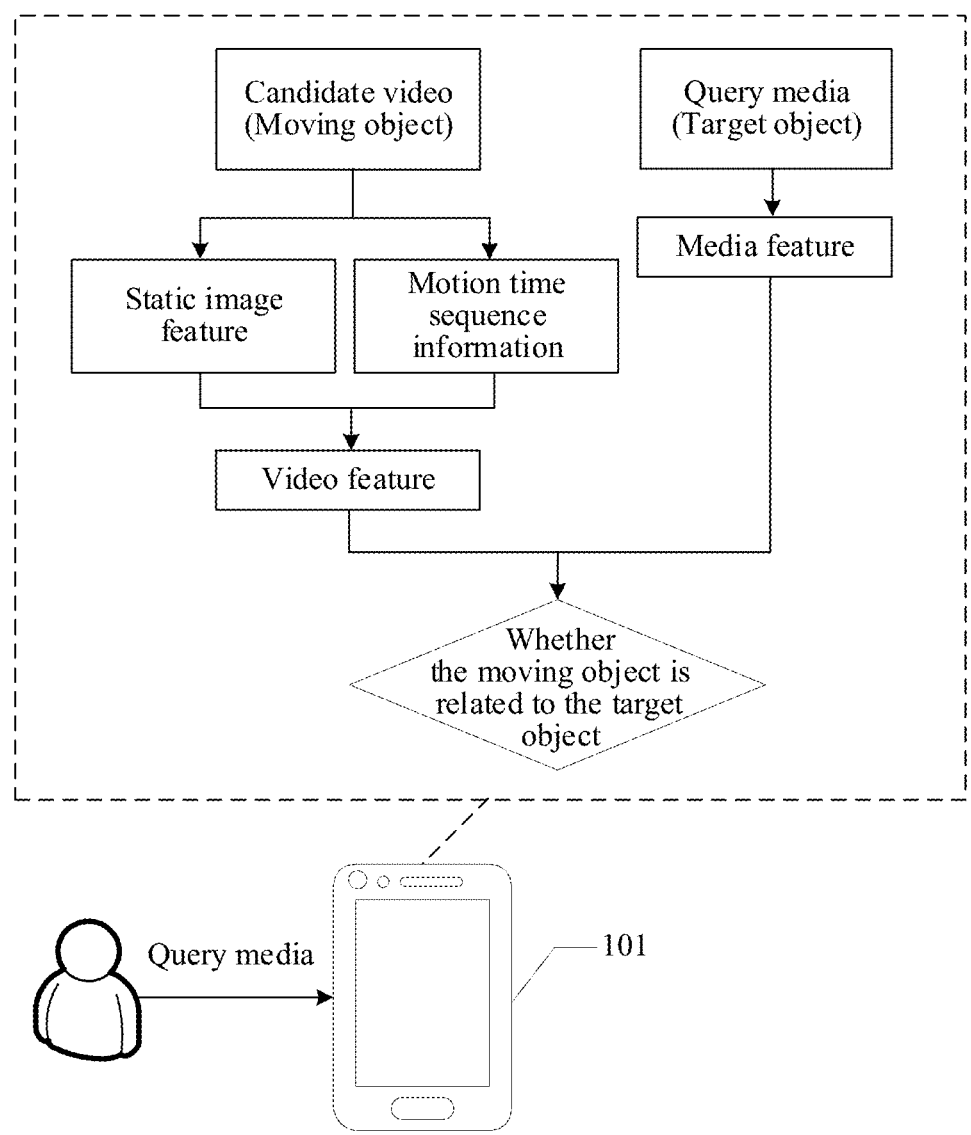
FIG. 1 is a schematic diagram of an application scenario of a video query method according to an embodiment of the present disclosure.

FIG. 1 is an exemplary diagram of an application scenario of a video query method. This scenario includes a terminal device 101. When a user performs video query by using a query media, the terminal device 101 can determine a media feature of the query media according to the obtained query media. Moreover, the terminal device 101 may further determine a corresponding static image feature according to a candidate video corresponding to the query media. In one embodiment of the present disclosure, the media feature, the static image feature, and the video feature and sub-feature mentioned subsequently are each a type of feature that can reflect information of related content carried in an identified object (for example, an image, or a video). For example, a static image feature of an image may reflect image information displayed in the image, and a static image feature of a video may reflect image information in the video, that is, more attention is paid to static information of each video frame. A video feature of a video may reflect video information in the video, that is, more attention is paid to dynamic information reflected in continuous video frames.

In one embodiment of the present disclosure, the candidate video belongs to any video in a video query range of the query media. The candidate video includes an object in motion, which is referred to as a "moving object" in the present disclosure. In one embodiment, the moving object is an actively moving object, or a passively moving object. For example, the moving object is a person, an animal, or an object. In the candidate video, there may be one or more moving objects. For ease of description, in the subsequent embodiments, the description is mainly focused on the processing flow of one moving object in the candidate video. However, the quantity of moving objects in the candidate video is not limited in this embodiment of the present disclosure.

The media format of the query media is not limited in this embodiment of the present disclosure, and may be an image or a video. Regardless of the media format of the query media, the query media includes a target object. The target object may be various possible objects such as a person, an animal, or an object. In the query media, the target object may be moving or stationary.

The terminal device 101 determines the video feature of the candidate video according to the static image feature and motion time sequence information of the moving object in the candidate video. Because information reflected by the moving object in motion can be accurately captured by using the motion time sequence information, the determined video feature can accurately describe the moving object, thereby effectively avoiding the recognition difficulty caused by the original moving object in the video query. Whether the moving object in the candidate video is related to the target object in the query media can be accurately determined by the terminal device 101 according to the media feature and the video feature, thereby improving the query accuracy and query experience of a user.

Figure 2:
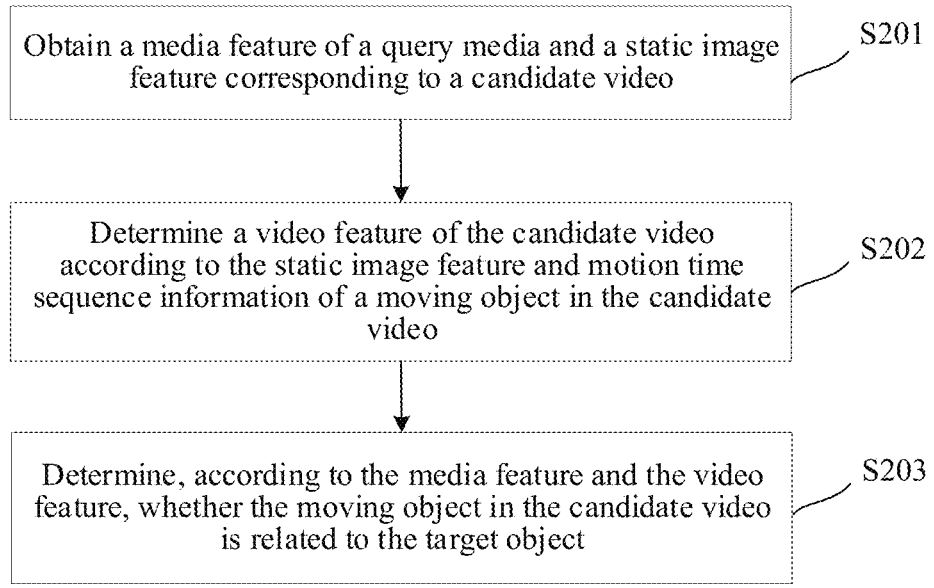
FIG. 2 is a flowchart of a video query method according to an embodiment of the present disclosure.

Next, the video query method provided in one embodiment of the present disclosure is described in detail with reference to the accompanying drawings by using an example in which a terminal device is used as an execution subject. Referring to FIG. 2, the method includes the following steps:

S201. Obtain a media feature of a query media and a static image feature corresponding to a candidate video.

In one embodiment, the media feature of the query media and the static image feature corresponding to the candidate video are obtained by using a convolutional neural network.

However, because the video may include a moving object, when feature extraction is performed on the video, to better obtain motion information in the video, in one embodiment, the media feature of the query media and the static image feature corresponding to the candidate video may be obtained by using a three-dimensional convolutional neural network.

In one embodiment, when S201 is performed, the static image feature corresponding to the candidate video may be obtained by using the three-dimensional convolutional neural network. The format of the query media includes at least one of image and video. If the query media is a video, the video feature corresponding to the query media may be obtained by using the three-dimensional convolutional neural network; if the query media is an image, the static image feature corresponding to the query media may be obtained by using the three-dimensional convolutional neural network; or the media feature corresponding to the query media may be obtained by using another convolutional neural network.

In other words, when the query media is of a video type, the media feature is a video feature; and when the query media is of an image type, the media feature is a static image feature. The static image feature may be understood as a feature extracted from static information of a single image, a feature extracted from static information of a single video frame, or a feature extracted from static information of a single video segment.

Training of a three-dimensional convolutional neural network requires a large quantity of labeled videos and consumes a large quantity of computing resources. To reduce the demand for computing resources, in a possible implementation, a three-dimensional convolutional neural network (I3D) model pre-trained on a Kinetics dataset may be directly used to obtain the media feature of the query media and the static image feature corresponding to the candidate video.

The Kinetics dataset is a dataset released by the Deepmind team. The Kinetics dataset is a large-scale and high-quality dataset, including approximately 650,000 video clips. The video clips cover 700 human action categories, including human-object interactions such as playing musical instruments, and human-to-human interactions such as shaking hands and hugging. Each action category has at least 600 video clips. Each video clip has a separate action category, which can be manually annotated and lasts about 10 seconds.

As can be understood, the media feature of the query media and the static image feature corresponding to the candidate video may be obtained simultaneously, or the media feature of the query media and the static image feature corresponding to the candidate video may be obtained at different times. For example, the static image feature corresponding to the candidate video may be obtained in advance. When the user performs the video query by using the query media, the terminal device obtains the query media, and then obtains the media feature of the query media; or, when the user performs the video query by using the query media, after the terminal device obtains the query media, the terminal device simultaneously obtains the media feature of the query media and the static image feature corresponding to the candidate video.

S202. Determine a video feature of the candidate video according to the static image feature and motion time sequence information of the moving object in the candidate video.

In one embodiment of the present disclosure, the motion time sequence information of the moving object is used for identifying changes of a motion trend of the moving object over time in the candidate video. For example, the motion time sequence information of the moving object includes a change of a motion position of the moving object under the motion trend between adjacent time nodes. In one embodiment, the motion time sequence information is obtained by learning the candidate video by using a neural network, and may alternatively be obtained by using another method, such as a labeling method.

During determining of the video feature of the candidate video, in addition to the static image feature that can reflect static information in the candidate video, the motion time sequence information of the candidate video is further introduced. Therefore, in the process of determining the video feature of the candidate video, the information reflected by the moving object in the candidate videos can be accurately captured by using the motion time sequence information, so that the information carried by the video feature can accurately describe a motion situation of the moving object in the candidate video, that is, the video feature can clearly identify the moving object.

Therefore, in the subsequent process of determining whether the moving object is related to the target object, high-quality information related to the moving object can be provided in the video feature, which improves the accuracy of the judgment.

S203. Determine, according to the media feature and the video feature, whether the moving object in the candidate video is related to the target object.

As can be understood, after determining whether the moving object in the candidate video is related to the target object, the terminal device classifies the candidate video in which the moving object is related to the target object into a query result according to the determining result, and displays the query result to the user after the query is completed, to help the user find the candidate video related to the query video.

In the video query process, according to whether a video segment of the candidate video is related to the target object, time intervals in the candidate video that are related to the target object are determined. Therefore, when the query result is provided to the user, related interval information in the queried candidate video, that is, an interval of interest to the user, is provided simultaneously. It is avoided that the user needs to check the query result from the beginning to the end to find parts related to the query requirement (such as the target object) after obtaining the query result, so that the user spends less time on checking the query result.

There may be a lot of content displayed in the video. Even if the user directly checks the related parts of the candidate video through the related interval information, the user may fail to find positions of the target object on a current video display interface in a short time. Therefore, to improve the checking efficiency of the user, one embodiment of the present disclosure further provides a method for identifying the candidate video, in which an appearance region of the target object is identified in the candidate video, to effectively guide the user.

In this implementation, after it is determined in S203 whether the moving object in a $t^{th}$ video segment is related to the target object, a target region in the $t^{th}$ video segment of the candidate video may be further identified, thereby intuitively pointing out, to the user, positions of the target object on the current video display interface. For example, when the user checks a video in the query result, the user can directly play the video from a playback progress corresponding to the video according to the time interval information provided by the query result. During the playback, when a target object (or a moving object related to the target object) appears, an appearance region of the target object has a specific identification effect, such as a bold-color frame, so that the user can quickly focus on the target object to achieve a query purpose under the guidance of the identification effect.

As can be seen from the foregoing technical solutions, the media feature of the query media and the static image feature corresponding to the candidate video are obtained. The query media includes the target object, and the candidate video includes the moving object. The video feature of the candidate video is determined according to the static image feature and the motion time sequence information of the moving object in the candidate video. Because information reflected by the moving object in motion can be accurately captured by using the motion time sequence information, the determined video feature can accurately describe the moving object, thereby effectively avoiding negative impact caused by the original moving object in the video query. Whether the moving object in the candidate video is related to the target object in the query media can be accurately determined according to the media feature and the video feature, thereby improving query experience of a user.

Because the moving object in the candidate video has a certain motion mode, that is, the moving object is generally not always in a fixed position in the video, but may appear in different positions of the video at different time points according to the motion mode. Therefore, during determining of the video feature of the candidate video, the candidate video may be segmented, and corresponding sub-features may be determined for different video segments, so that the motion mode of the moving object can be determined more accurately by using the sub-features, to improve the query accuracy during subsequent video query.

The terminal device obtains a plurality of video segments, for example, n video segments, by segmenting the candidate video based on time sequence, where n is an integer greater than 1. One video segment includes at least one video frame, and different video segments may include different quantities of video frames. Among the n video segments obtained by the terminal device through segmentation, a $t^{th}$ video segment and a $(t-1)^{th}$ video segment are adjacent video segments in time sequence, and the $t^{th}$ video segment is in a time interval later than that of the $(t-1)^{th}$ video segment, where t is a positive integer greater than 1 and not greater than n.

The sub-feature corresponding to the $t^{th}$ video segment carries a feature used for reflecting information in the first video segment to the $t^{th}$ video segment of the candidate video. The sub-feature corresponding to the last video segment is equivalent to the video feature corresponding to the candidate video.

In the $t^{th}$ video segment, the moving object in the candidate video may have moved from a position a to a position b in the video image. In the conventional method in which the motion trend of the moving object is not considered, information of the moving object reflected by the sub-feature corresponding to the $t^{th}$ video segment is not concentrated, and may be scattered between the position a and the position b in a feature plane of the sub-feature. In other words, the sub-feature determined in the conventional method cannot not clearly reflect the related information of the moving object. Consequently, even if the moving object is actually related to the target object in the video query, it is difficult to accurately determine a related result. Therefore, one embodiment of the present disclosure provides a method of determining a sub-feature in a video segment based on motion time sequence information. According to the method, related information of the moving object in the sub-feature can be enhanced to improve the query accuracy.

The candidate video may include a plurality of video segments, each video segment corresponds to a sub-feature, a $t^{th}$ video segment corresponds to a $t^{th}$ sub-feature, and each sub-feature is determined based on motion time sequence information. The method of determining the sub-feature corresponding to each video segment is similar. Next, for ease of introduction, the method of determining the sub-feature based on the motion time sequence information is introduced by using the $t^{th}$ sub-feature as an example.

In a possible implementation, the method includes: determining a target motion trend in a $t^{th}$ video segment of a moving object in a $(t-1)^{th}$ sub-feature. Because the motion time sequence information of the moving object in the candidate video can reflect the motion trend of the moving object between adjacent video segments, and the $t^{th}$ video segment and the $(t-1)^{th}$ video segment are adjacent video segments in time sequence, the target motion trend of the moving object from the $(t-1)^{th}$ sub-feature in the $t^{th}$ video segment can be determined according to the motion time sequence information.

Then, a target region corresponding to the moving object in a feature plane of the $(t-1)^{th}$ sub-feature is adjusted according to the target motion trend, so that the target region moves to the position of the moving object in the $t^{th}$ video segment. Next, the $t^{th}$ sub-feature is determined according to the adjusted $(t-1)^{th}$ sub-feature and a static image feature corresponding to the $t^{th}$ video segment. The information in the $(t-1)^{th}$ video segment is superimposed on the information in the $t^{th}$ video segment, the $(t-1)^{th}$ video segment further carries the information in the previous video segment, and so on. Therefore, the determined $t^{th}$ sub-feature carries features used for reflecting the information in the first video segment to the $t^{th}$ video segment of the candidate video, thereby enhancing the related information of the moving object in the sub-feature, and helping improve the query accuracy.

Figure 3:
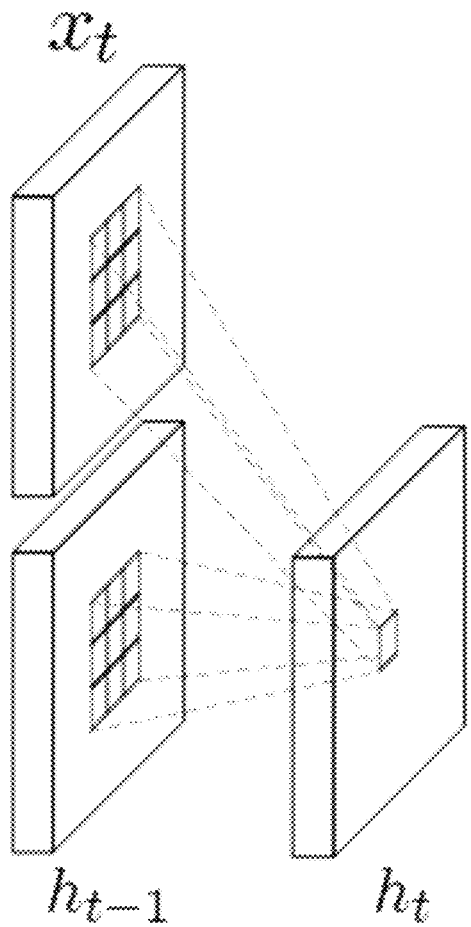
FIG. 3 is an exemplary diagram of a convolutional long short-term memory neural network in a conventional manner.

In the conventional method, the motion trend of the moving object is not considered; instead, a convolutional long short-term memory neural network (ConvLSTM) is directly used to determine the $t^{th}$ sub-feature. The schematic principle diagram of the convolutional long short-term memory neural network is shown in FIG. 3, where $x_t$ represents a static image feature corresponding to a $t^{th}$ video segment, $h_{t-1}$ represents a $(t-1)^{th}$ sub-feature, and $h_t$ represents a $t^{th}$ sub-feature. In other words, the convolutional long short-term memory neural network used in the conventional method directly uses the static image feature $x_t$ corresponding to the $t^{th}$ video segment and the $(t-1)^{th}$ sub-feature $h_{t-1}$ to determine the $t^{th}$ sub-feature $h_t$.

Figure 4:
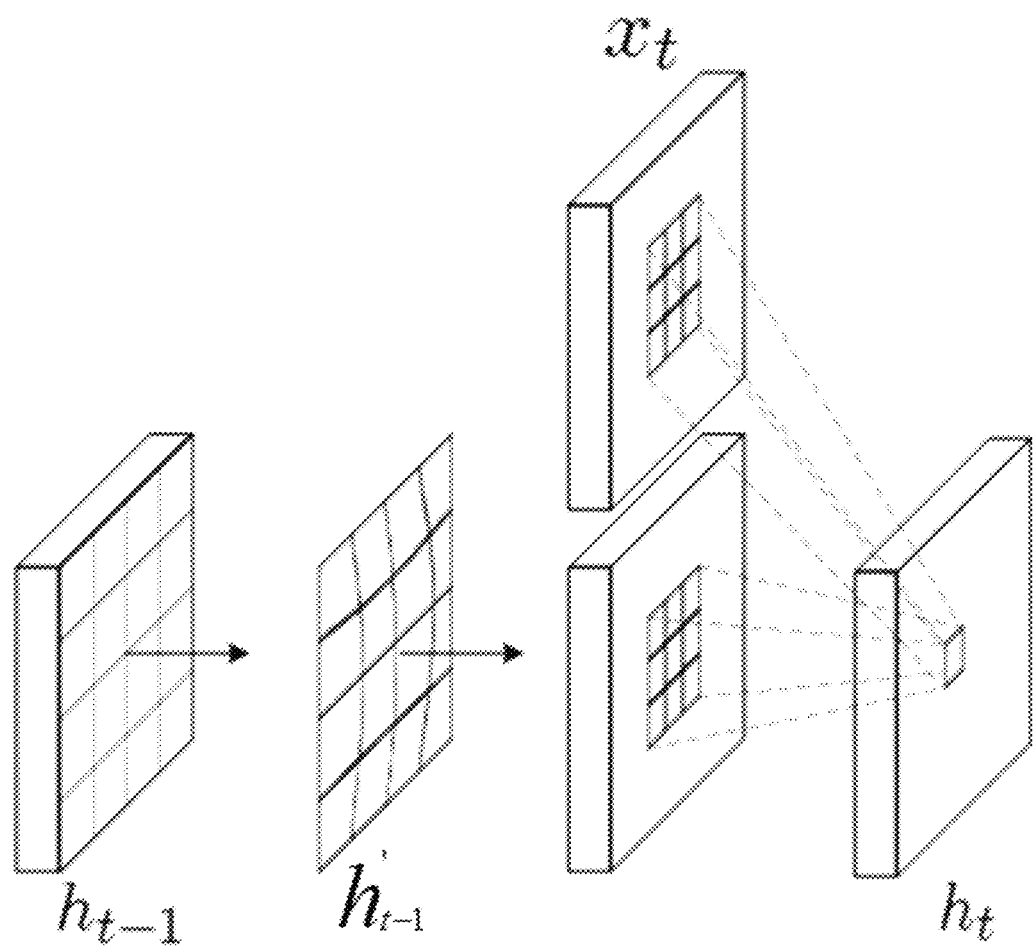
FIG. 4 is an exemplary diagram of a warp long short-term memory neural network according to an embodiment of the present disclosure.

Compared with the conventional method, in the method of determining the sub-feature according to the motion time sequence information provided in one embodiment of the present disclosure, a warp long short-term memory neural network is used. The warp long short-term memory neural network is a modification of the conventional convolutional long short-term memory neural network. The schematic principle diagram of the warp long short-term memory neural network is shown in FIG. 4. $x_t$ represents a static image feature corresponding to a $t^{th}$ video segment, $h_{t-1}$ represents a $(t-1)^{th}$ sub-feature, $h_t$ represents a $t^{th}$ sub-feature, and $h'_{t-1}$ represents a $(t-1)^{th}$ sub-feature adjusted according to a target motion trend. In other words, the warp long short-term memory neural network used in one embodiment of the present disclosure uses the static image feature $x_t$ corresponding to the $t^{th}$ video segment and the adjusted $(t-1)^{th}$ sub-feature $h'_{t-1}$ to determine the $t^{th}$ sub-feature $h_t$.

How to adjust a target region corresponding to the moving object in the feature plane of the $(t-1)^{th}$ sub-feature according to the target motion trend is described in detail below.

In a possible implementation, some control points may be defined on the feature plane. The control points are evenly distributed on the feature plane. For example, in FIG. 4, there are 9 control points located on intersections of three horizontal lines and three vertical lines. $\{(x_1,y_1), \cdots, (x_n,y_n)\}$ is used to represent n defined control points, then a formula for calculating the feature plane is:

$$S(x, y) = \sum_{i=1}^{n} w_i \varphi_k(\|(x, y) - (x_i, y_i)\|) + v_1 x + v_2 y + v_3$$

where $S(x,y)$ represents the feature plane, $\varphi_k$ is a radial basis function, $w_i$, $v_1$, $v_2$, $v_3$ are all interpolation parameters, $(x_i, y_i)$ is coordinates of an $i^{th}$ control point, n is a quantity of the control points, and i is a positive integer not greater than n.

After the control points are defined, a convolutional layer of the warp long short-term memory neural network is used to predict a deviation value $(d_{xi}, d_{yi})$ of each control point. For the $i^{th}$ control point $(x_i, y_i)$, a position after deviation becomes $(x_i+d_{xi}, y_i+d_{yi})$. While the control point is moved, a region near the control point also moves, for example, similar to the weighted movement in skeletal animation. Therefore, moving the target region is equivalent to moving the control points in the target region. To adjust the target region, a deviation value corresponding to a control point in the target region may be determined according to the target motion trend, then the control point is moved according to the deviation value, and the target region corresponding to the moving object in the feature plane of the $(t-1)^{th}$ sub-feature is adjusted based on the moved control point.

In this case, a formula of the warp long short-term memory neural network is expressed as follows:

$d_{t-1} = w_{xd}*x_t + w_{hd}*h_{t-1} + b_d$ $\hat{h}_{t-1} = \text{warp}(h_{t-1}, d_{t-1})$ $\hat{c}_{t-1} = \text{warp}(c_{t-1}, d_{t-1})$ $i_t = \sigma(w_{xi}*x_t + w_{hi}*\hat{h}_{t-1} + b_i)$ $g_t = \sigma(w_{xg}*x_t + w_{hg}*\hat{h}_{t-1} + b_g)$ $f_t = \sigma(w_{xf}*x_t + w_{hf}*\hat{h}_{t-1} + b_f)$ $o_t = \sigma(w_{xo}*x_t + w_{ho}*\hat{h}_{t-1} + b_o)$ $c_t = f_t \odot \hat{c}_{t-1} + i_t \odot g_t$ $h_t = o_t \odot \varphi(c_t)$ $d_{t-1}$ represents the deviation value $(d_{xi}, d_{yi})$ corresponding to the control point in the target region, $x_t$ is the static image feature corresponding to the $t^{th}$ video segment, and is used as an input of the warp long short-term memory neural network, and $h_{t-1}$ is the $(t-1)^{th}$ sub-feature; $\hat{h}_{t-1}$ is the $(t-1)^{th}$ sub-feature obtained after the control point is moved according to the deviation value $d_{t-1}$, $\hat{c}_{t-1}$ is the $(t-1)^{th}$ sub-feature obtained after the control point is moved according to the deviation value $d_{t-1}$, $\hat{h}_{t-1}$ and $\hat{c}_{t-1}$ jointly constitute the $(t-1)^{th}$ sub-feature, and warp( ) is a warp function; $\sigma$ ( ) represents a sigmoid activation function; $i_t$, $g_t$, $f_t$, and $o_t$ are respectively an input gate, a new input, a forget gate, and an output gate of the warp long short-term memory neural network; $w_{xd}$, $w_{hd}$, $w_{xi}$, $w_{hi}$, $w_{xg}$, $w_{hg}$, $w_{xf}$, $w_{hf}$, $w_{xo}$, $w_{ho}$, $b_d$, $b_i$, $b_g$, $b_f$, and $b_o$ are all model parameters; $h_t$ is the obtained $t^{th}$ sub-feature, and is used as an output of the warp long short-term memory neural network model, and $\odot$ represents an equivalence operation.

In the video segment, in addition to the related information that can reflect the moving object, the sub-feature further includes other information, such as video background and information that is obviously not related to the moving object. Therefore, to reduce a computing amount during calculation of whether the moving object is related to the target object, information of such regions may be removed in advance, and information of the region that may be related to the target object is retained, to improve the efficiency of video query.

For the $t^{th}$ sub-feature, a possible implementation of S203 is: determining a target region having an association relationship with the target object in a feature plane of the $t^{th}$ sub-feature by removing information that is obviously not related to the target object.

In one embodiment, the target region and the region feature of the target region may be determined by using the following method. In a video segment, some boxes are evenly placed. The boxes may cover all positions in the video segment, and some boxes overlap partially. Then, whether a region corresponding to the box has an association relationship with the target object is determined by using a region proposal network (RPN), to determine the target region. A formula for determining the target region is as follows:

$p_k = \text{PRN}(h_i)$ $p_k$ is a $k^{th}$ target region, $h_i$ is an $i^{th}$ sub-feature, and PRN is a region proposal function.

After the target region is determined, the region feature corresponding to the target region is determined according to the $t^{th}$ sub-feature, thereby determining, according to the region feature and the media feature, whether the moving object in the $t^{th}$ video segment is related to the target object. A formula for determining the region feature of the target region is as follows:

$f_k^p = \text{ROI}(h_i; p_k)$ $f_k^p$ is the region feature of the target region, $p_k$ is the $k^{th}$ target region, $h_i$ is the $i^{th}$ sub-feature, and ROI is a region pooling function.

When a query media is of a video format, that is, a query video, the target object may not appear in each video frame of the query video, or may be fuzzy or incomplete in some video frames. In this case, if a video feature corresponding to the query video is used as a query basis, the computing amount may be increased or the query accuracy may be reduced because the video feature carries too much other information. For example, video background content of a matched candidate video is similar to video background content of the query video, and consequently, there is no target object. To avoid such a case and reduce the computing amount, one embodiment of the present disclosure uses an attention weighting method to determine a query video feature that can better reflect the related information of the target object.

In the process of determining whether the moving object in the $t^{-th}$ video segment is related to the target object, first, a weight between video frame content in the query video and the target object is determined by using an attention model. Normally, a more complete or clearer target object included in the video frame content in the query video indicates a higher weight between the obtained video frame content in the query video and the target object. For example, the weight may be determined according to a correlation between the query video and the target region in the candidate video, where a formula for calculating the correlation between the query video and the target region in the candidate video, and a formula for calculating the weight are:

$$e_{k,j} = \tanh(W^q avg(f_j^q) + W^r avg(f_k^p) + b_p)$$

$$\alpha_{k,j} = \frac{\exp(\omega^T e_{k,j} + b_s)}{\sum_i \exp(\omega^T e_{k,j} + b_s)}$$

where $f_j^q$ represents the video feature of the query video, $f_k^p$ represents the region feature of the target region, $e_{k,j}$ represents a correlation vector of $f_j^q$ and $f_k^p$, avg is an average function, $\alpha_{k,j}$ is the weight between the video frame content in the query video and the target object, $W^q$, $W^r$, $\omega$, $b_p$, and $b_s$ are all model parameters, and $\omega^T$ is a transpose of $\omega$.

In this way, when the query video feature of the query video is determined according to the determined weight, the impact of information other than the target object on the query video feature is reduced, and the related information of the target object in the query video feature is enhanced, to more accurately determine, according to the region feature and the query video feature, whether the moving object in the $t^{th}$ video segment is related to the target object.

A formula for calculating the query video feature is:

$$\bar{f}_k^q = \sum_j \alpha_{k,j} f_j^q$$

where, $\bar{f}_k^q$ is a weighted query video feature, $\alpha_{k,j}$ is the weight between the video frame content in the query video and the target object, and $f_j^q$ is the video feature of the query video.

For example, the query video includes 20 video frames, where the fifth video frame includes a complete and clear target object, while the target object does not appear, or is fuzzy or incomplete in the remaining video frames. Then, weights between the video frames and the target object that are determined by the attention model may be as follows: a weight corresponding to the fifth video frame is 0.9, and weights corresponding to the remaining video frames are 0.1. When the query video feature of the query video is determined according to the determined weight, because the weight corresponding to the fifth video frame is obviously greater than the weights of the remaining video frames, the obtained query video feature mainly reflects related information of the target object in the fifth video frame, thereby reducing the impact of information other than the target object on the query video feature, and enhancing the related information of the target object in the query video feature, to more accurately determine whether the moving object in the video segment is related to the target object.

After the query video feature $\bar{f}_k^q$ and the region feature $f_i^p$ of the target region are obtained, the two features may be spliced. Through two convolutional layers and two fully-connected layers, whether the target region is related to the query video, and precise region coordinates of the target region related to the query video are outputted.

A formula for determining, according to the region feature and the query video feature, whether the moving object in the $t^{th}$ video segment is related to the target object, and a formula for calculating the precise region coordinates of the target region related to the query video are:

$$f = [\bar{f}_k^q; f_i^p]$$

$$l = \text{softmax}[FC(Conv(f))]$$

$$bb = FC(Conv(f))$$

where f is a feature obtained by splicing the two features $\bar{f}_k^q$ and $f_i^p$, l is a relevant or irrelevant category obtained by classification, bb is the precise region coordinates, Conv represents a convolutional layer, FC represents a fully-connected layer, and softmax is a Softmax activation function.

The following describes the video query method provided in one embodiment of the present disclosure with reference to an actual application scenario. In the present disclosure scenario, the query media is a query video (for example, a released short video), and a user wants to determine whether there is a copy of the short video in the candidate video by querying the query video. Therefore, the video query may be performed by using the method provided in this embodiment of the present disclosure.

Figure 5:
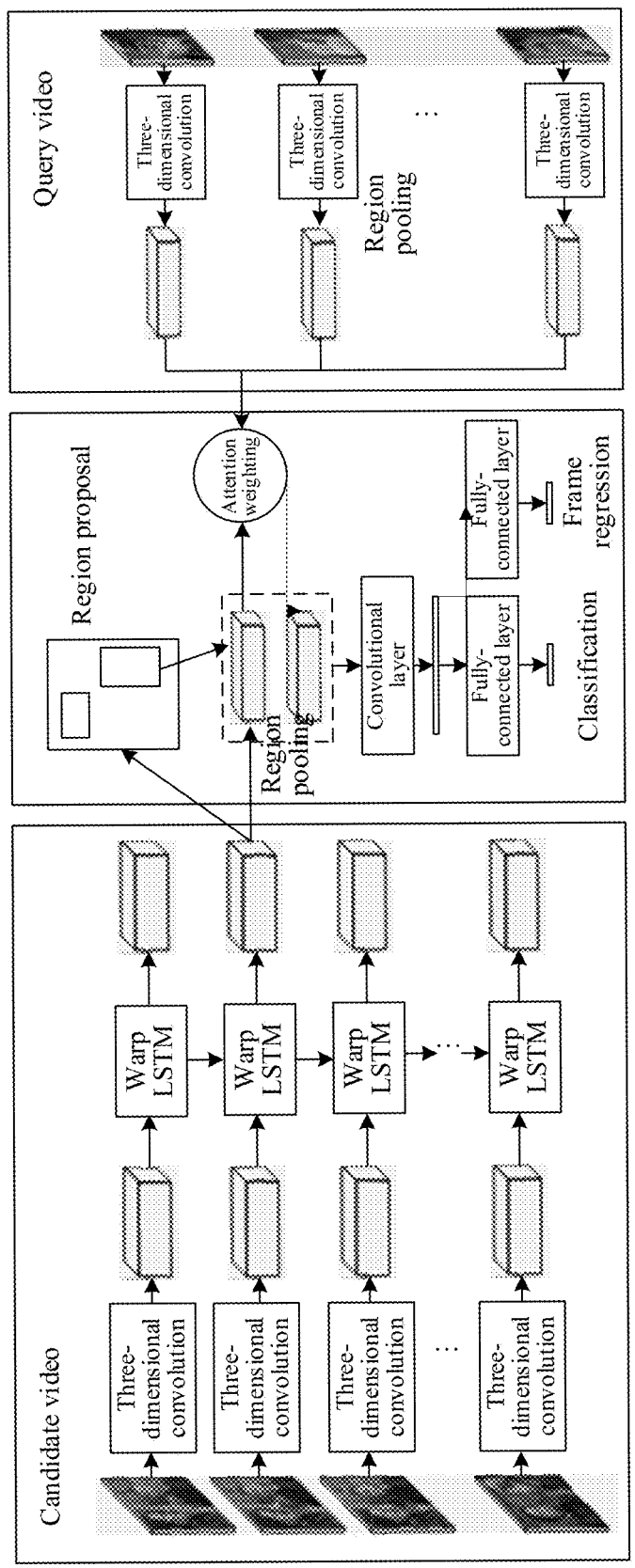
FIG. 5 is a structural diagram of a processing flow of a video query method according to an embodiment of the present disclosure.

The video query performed by using the method provided in one embodiment of the present disclosure mainly includes five parts: video feature extraction, long video warp accumulation, region proposal, attention weighting, and region precision. A structural flowchart of the video query method is shown in FIG. 5.

Part 1: Video Feature Extraction:

For a given query video and a candidate video, first, feature extraction is performed on the query video and the candidate video respectively. For example, the query video and the candidate video may be segmented respectively, to obtain a plurality of video segments respectively, then feature extraction is performed on the video segments of the candidate video and the query video respectively by using a three-dimensional convolutional network, to obtain static image features corresponding to the video segments.

Part 2: Long Video Warp Accumulation:

Because the candidate video includes a moving object, to accurately capture information reflected by the moving object in motion, a warp long short-term memory neural network (WarpLSTM) may be used to collect motion time sequence information in the candidate video, and sub-features of the video segments of the candidate video are warped and adjusted according to the motion time sequence information, so that during determining of a $t^{th}$ sub-feature, the $t^{th}$ sub-feature may be determined according to an adjusted $(t-1)^{th}$ sub-feature and a static image feature corresponding to the extracted $t^{th}$ video segment.

Part 3: Region Proposal:

A target region in the candidate video that may have an association relationship with the target object in the query video is selected by using a region proposal network, and a region feature corresponding to the target region is determined by using a region pooling method.

Part 4: Attention Weighting:

For the query video, to determine a query video feature that can better reflect related information of the target object, attention weighting may be performed on the query video, to obtain a weighted query video feature.

Part Five: Region Precision:

After the query video feature and the region feature of the target region are obtained, the two features may be spliced. Through comparison with the candidate video by using a convolutional layer and two fully-connected layers, a category of whether the target region is related to the query video, and precise region coordinates of the target region related to the query video are respectively outputted, thereby precisely positioning regions in video segments in the candidate video that are related to the query video. The process of outputting whether the target region is related to the query video may be referred to as a classification process. Outputting the precise region coordinates of the target region related to the query video may be embodied as identifying the target region, for example, setting a bold-color frame for the target region. In this case, the process of outputting the precise region coordinates of the target region related to the query video may be referred to as frame regression.

The present disclosure provides an end-to-end video spatial-temporal repositioning method. After a short query video is given, according to the present disclosure, spatial-temporal video segments that contain the same semantic content as the query video may be queried in other long candidate videos. The so-called "spatial-temporal video segment" refers to: in the time dimension, positioning a video segment in a long candidate video; and in the spatial dimension, accurately returning to a target region in the queried video segment, where the target region is a region related to the query video. In an example, after a short query video is given by the user, according to the present disclosure, a part of interest to the user can be quickly positioned in the long candidate video, and the user does not need to browse from the beginning to the end in person, thereby saving time. In addition, this technology can also be used for video copy detection, to detect the dissemination of copyright infringing videos.

Figure 6:
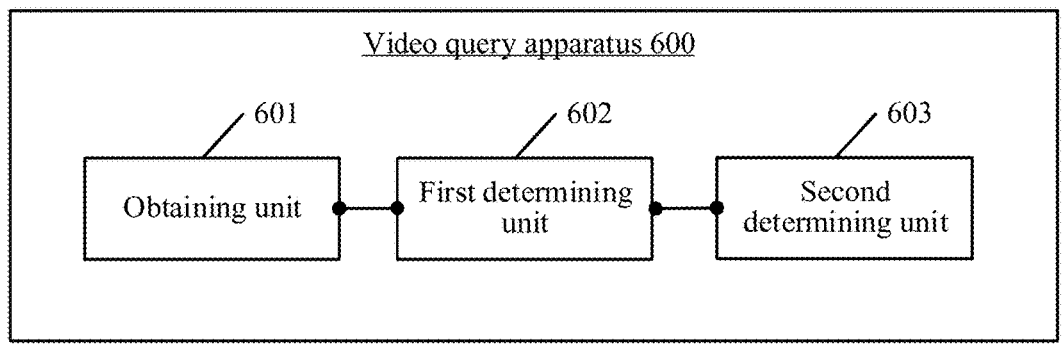
FIG. 6 is a structural diagram of a video query apparatus according to an embodiment of the present disclosure.

Based on the video query method provided in the foregoing embodiments, an embodiment of the present disclosure further provides a video query apparatus. Referring to FIG. 6, the apparatus includes: an obtaining unit 601, a first determining unit 602, and a second determining unit 603:

the obtaining unit 601 being configured to obtain a media feature of a query media and a static image feature corresponding to a candidate video, the query media including a target object, the candidate video including a moving object;

the first determining unit 602 being configured to determine a video feature of the candidate video according to the static image feature and motion time sequence information of the moving object in the candidate video; and the second determining unit 603 being configured to determine, according to the media feature and the video feature, whether the moving object in the candidate video is related to the target object.

In a possible implementation, the video feature includes sub-features corresponding to n video segments in the candidate video; a $t^{th}$ video segment corresponds to a $t^{th}$ sub-feature; the motion time sequence information reflects motion trends of the moving object between adjacent video segments, t being a positive integer greater than 1 and not greater than n, n being an integer greater than 1; and the first determining unit 602 is specifically configured to:

determine, in the $t^{th}$ video segment, a target motion trend of a moving object, the moving object being from a $(t-1)^{th}$ sub-feature;

adjust a target region corresponding to the moving object in a feature plane of the $(t-1)^{th}$ sub-feature according to the target motion trend; and determine the $t^{th}$ sub-feature according to the adjusted $(t-1)^{th}$ sub-feature and a static image feature corresponding to the $t^{th}$ video segment.

In a possible implementation, the first determining unit 602 is further configured to:

determine a deviation value corresponding to a control point in the target region according to the target motion trend; and move the control point according to the deviation value, and adjust the target region corresponding to the moving object in the feature plane of the $(t-1)^{th}$ sub-feature based on the moved control point.

In a possible implementation, the second determining unit 603 is specifically configured to:

determine a target region having an association relationship with the target object in a feature plane of the $t^{th}$ sub-feature;

determine a region feature corresponding to the target region according to the $t^{th}$ sub-feature; and determine, according to the region feature and the media feature, whether the moving object in the $t^{th}$ video segment is related to the target object.

In a possible implementation, the second determining unit 603 is further configured to:

determine a weight between video frame content in the query video and the target object by using an attention model;

determine a query video feature of the query video according to the weight; and determine, according to the region feature and the query video feature, whether the moving object in the $t^{th}$ video segment is related to the target object.

Figure 7:
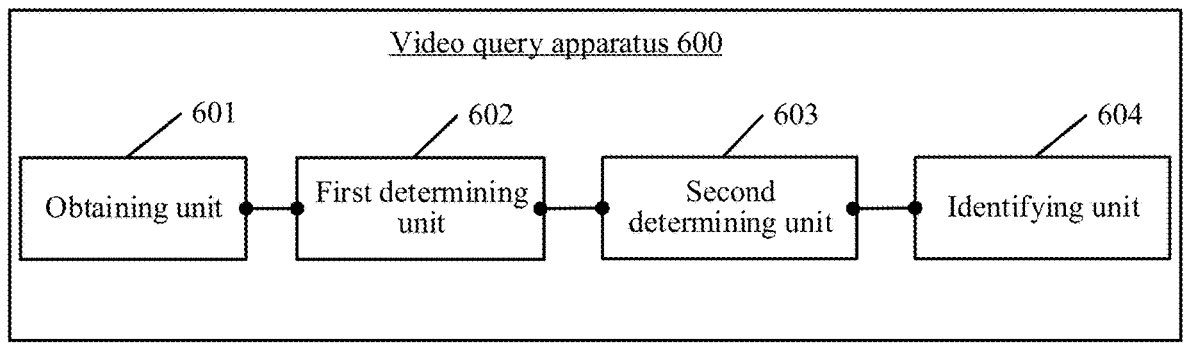
FIG. 7 is a structural diagram of a video query apparatus according to an embodiment of the present disclosure.

In a possible implementation, when the moving object in the $t^{th}$ video segment is related to the target object, referring to FIG. 7, the apparatus further includes an identifying unit 604:

the identifying unit 604 being configured to identify the target region in the $t^{th}$ video segment of the candidate video.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

As can be seen from the foregoing technical solutions, the media feature of the query media and the static image feature corresponding to the candidate video are obtained. The query media includes the target object, and the candidate video includes the moving object. The video feature of the candidate video is determined according to the static image feature and the motion time sequence information of the moving object in the candidate video. Because information reflected by the moving object in motion can be accurately captured by using the motion time sequence information, the determined video feature can accurately describe the moving object, thereby effectively avoiding negative impact caused by the original moving object in the video query. Whether the moving object in the candidate video is related to the target object in the query media can be accurately determined according to the media feature and the video feature, thereby improving query experience of a user.

Figure 8:
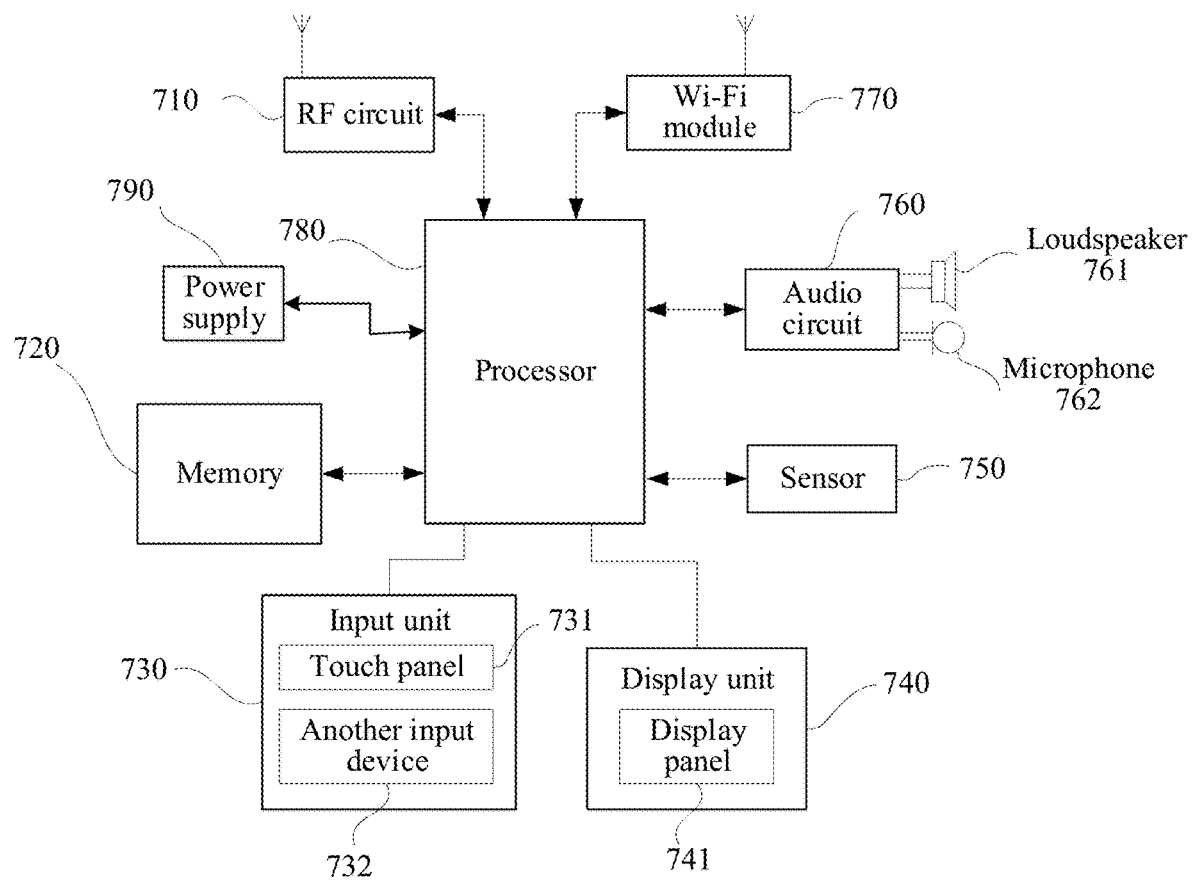
FIG. 8 is a structural diagram of a terminal device according to an embodiment of the present disclosure.

The embodiments of the present disclosure further provide a video query device, and the following describes the video query device with reference to the accompanying drawings. Referring to FIG. 8, the embodiments of the present disclosure provide a video query device 700, and the device 700 may alternatively be a terminal device. The terminal device may be any smart terminal including a mobile phone, a tablet computer, a personal digital assistant (PDA), a point of sales (POS), or an on-board computer, and the terminal device being a mobile phone is used as an example.

FIG. 8 is a block diagram of the structure of a part of a mobile phone related to a terminal device according to an embodiment of the present disclosure. Referring to FIG. 8, the mobile phone includes components such as a radio frequency (RF) circuit 710, a memory 720, an input unit 730, a display unit 740, a sensor 750, an audio circuit 760, a wireless fidelity (Wi-Fi) module 770, a processor 780, and a power supply 790. A person skilled in the art may understand that the structure of the mobile phone shown in FIG. 7 does not constitute a limitation on the mobile phone, and the mobile phone may include more components or fewer components than those shown in the figure, or some components may be combined, or a different component deployment may be used.

The following makes a specific description of components of the mobile phone with reference to FIG. 8.

The RF circuit 710 may be configured to receive and send signals during an information receiving and sending process or a call process. Particularly, the RF circuit receives downlink information from a base station, then delivers the downlink information to the processor 780 for processing, and sends involved uplink data to the base station. Generally, the RF circuit 710 includes, but is not limited to, an antenna, at least one amplifier, a transceiver, a coupler, a low noise amplifier (LNA), a duplexer, and the like. In addition, the RF circuit 710 may also communicate with a network and another device through wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 720 may include a high-speed random access memory, and may also include a nonvolatile memory, for example, at least one magnetic disk storage device, a flash memory, or another volatile solid-state storage device.

The input unit 730 may be configured to receive input digit or character information, and generate a keyboard signal input related to the user setting and function control of the mobile phone. Specifically, the input unit 730 may include a touch panel 731 and another input device 732. The touch panel 731, which may also be referred to as a touchscreen, may collect a touch operation of a user on or near the touch panel (such as an operation of a user on or near the touch panel 731 by using any suitable object or accessory such as a finger or a stylus), and drive a corresponding connection apparatus according to a preset program. In one embodiment, the touch panel 731 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 780. Moreover, the touch controller can receive and execute a command transmitted from the processor 780. In addition, the touch panel 731 may be implemented by using various types, such as a resistive type, a capacitive type, an infrared type, and a surface acoustic wave type. In addition to the touch panel 731, the input unit 730 may further include the another input device 732. Specifically, the another input device 732 may include, but is not limited to, one or more of a physical keyboard, a functional key (for example, a volume control key or a switch key), a track ball, a mouse, and a joystick.

The display unit 740 may be configured to display information input by the user or information provided for the user, and various menus of the mobile phone. The display unit 740 may include a display panel 741. In one embodiment, the display panel 741 may be configured in the form of a liquid crystal display (LCD), an organic light-emitting diode (OLED), or the like. Further, the touch panel 731 may cover the display panel 741. After detecting a touch operation on or near the touch panel 731, the touch panel 731 transfers the touch operation to the processor 780, so as to determine a type of the touch event. Then, the processor 780 provides corresponding visual output on the display panel 741 according to the type of the touch event. Although in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 750 such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 760, a loudspeaker 761, and a microphone 762 may provide audio interfaces between the user and the mobile phone. The audio circuit 760 may convert received audio data into an electric signal and transmit the electric signal to the loudspeaker 761. The loudspeaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 780 sends the audio data to, for example, another apparatus by using the RF circuit 710, or outputs the audio data to the memory 720 for further processing.

Wi-Fi is a short distance wireless transmission technology. The mobile phone may help, by using the Wi-Fi module 770, a user receives and transmits an email, browse a web page, access stream media, and the like. This provides wireless broadband Internet access for the user. Although FIG. 8 shows the Wi-Fi module 770, it may be understood that the Wi-Fi module is not a necessary component of the mobile phone, and when required, the Wi-Fi module may be omitted as long as the scope of the essence of the present disclosure is not changed.

The processor 780 is the control center of the mobile phone, and is connected to various parts of the mobile phone by using various interfaces and lines. By running or executing the software program and/or module stored in the memory 720, and invoking data stored in the memory 720, the processor 780 performs various functions and data processing of the mobile phone, thereby performing overall monitoring on the mobile phone. In one embodiment, the processor 780 may include one or more processing units. Preferably, an application processor and a modulation and demodulation processor may be integrated into the processor 780. The application processor mainly processes an operating system, a user interface, an application program, and the like, and the modulation and demodulation processor mainly processes wireless communication. It may be understood that the modulation and demodulation processor may not be integrated into the processor 780.

The mobile phone further includes the power supply 790 (such as a battery) for supplying power to the components. Preferably, the power supply may be logically connected to the processor 780 by using a power management system, thereby implementing functions such as charging, discharging, and power consumption management by using the power management system.

Although not shown in the figure, the mobile phone may further include a camera, a Bluetooth module, and the like. Details are not described herein again.

In one embodiment, the processor 780 included in the terminal device further has the following functions:

obtaining a media feature of a query media and a static image feature corresponding to a candidate video, the query media including a target object, the candidate video including a moving object;

determining a video feature of the candidate video according to the static image feature and motion time sequence information of the moving object in the candidate video; and determining, according to the media feature and the video feature, whether the moving object in the candidate video is related to the target object.

Figure 9:
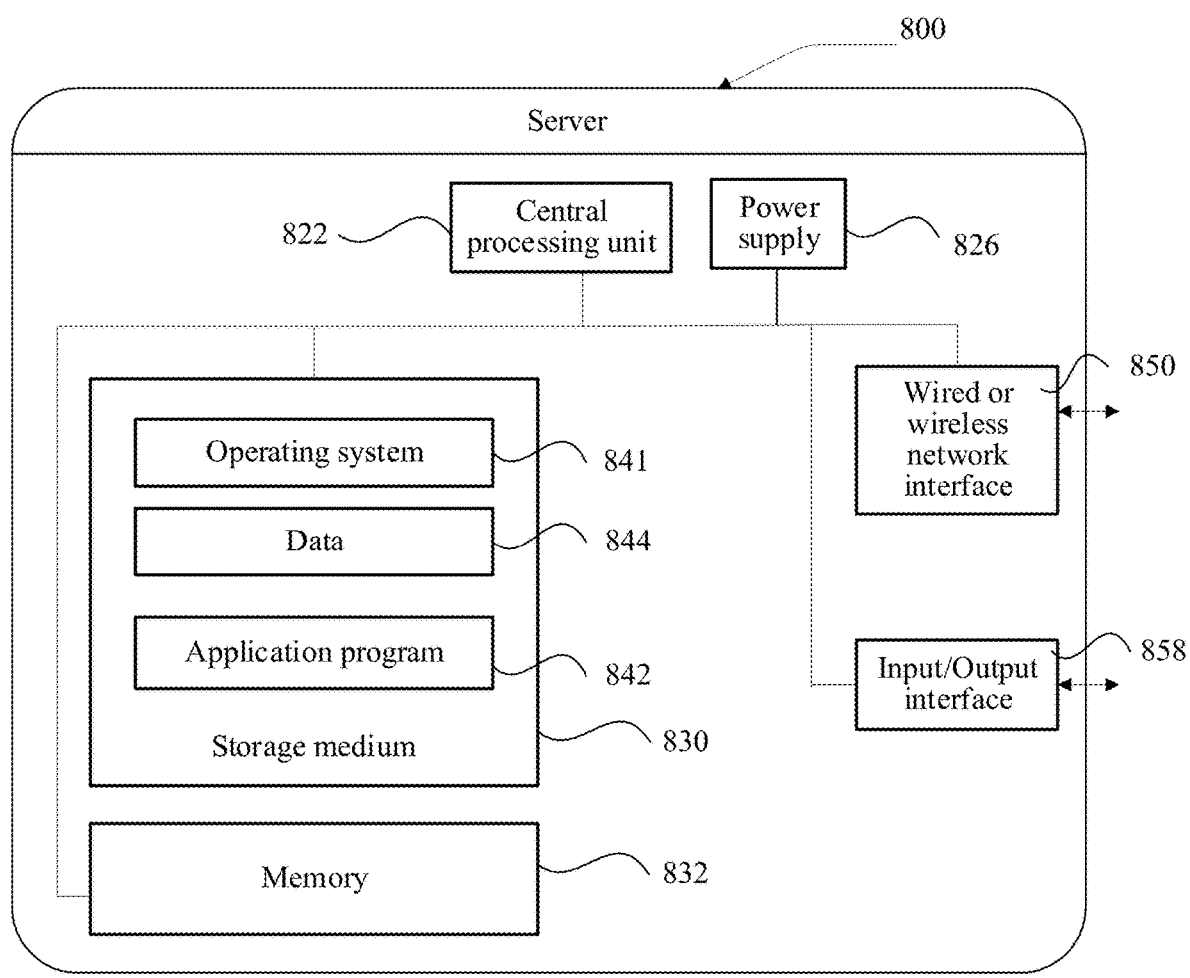
FIG. 9 is a structural diagram of a server according to an embodiment of the present disclosure.

The video query device provided in the embodiments of the present disclosure may be a server, as shown in FIG. 9.

FIG. 9 is a structural diagram of a server 800 according to an embodiment of the present disclosure. The server 800 may vary greatly due to different configurations or performance, and may include one or more central processing units (CPU) 822 (for example, one or more processors) and a memory 832, and one or more storage media 830 (for example, one or more mass storage devices) that store an application program 842 or data 844. The memory 832 and the storage medium 830 may be transient or persistent storage. The programs stored in the storage media 830 may include one or more modules (not shown in the figure), and each module may include a series of instructions to the server. Furthermore, the CPU 822 may be configured to be in communication with the storage media 830 and to execute the series of instructions in the storage media 830 on the server 800.

The server 800 may further include one or more power supplies 826, one or more wired or wireless network interfaces 850, one or more input/output interfaces 858, and/or one or more operating systems 841, such as Windows Server™, Mac OS X™, Unix™, Linux™, and FreeBSD™.

The steps performed by the server in the foregoing embodiment may be based on the structure of the server shown in FIG. 9.

The CPU 822 is at least configured to perform the following operations:

obtaining a media feature of a query media and a static image feature corresponding to a candidate video, the query media including a target object, the candidate video including a moving object;

determining a video feature of the candidate video according to the static image feature and motion time sequence information of the moving object in the candidate video; and determining, according to the media feature and the video feature, whether the moving object in the candidate video is related to the target object.

In one embodiment, the CPU 822 is further configured to perform the video query method described in the foregoing method embodiments.

An embodiment of the present disclosure provides a computer-readable storage medium, configured to store program code, the program code being used for performing the video query method described in the foregoing embodiments.

The terms such as "first", "second", "third", and "fourth" (if any) in the specification of the present disclosure and in the accompanying drawings are used for distinguishing similar objects and not necessarily used for describing any particular order or sequence. Data used in this way is interchangeable in a suitable case, so that the embodiments of the present disclosure described herein can be implemented in a sequence in addition to the sequence shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It is to be understood that, in the present disclosure, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "/"

in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

In the several embodiments provided in the present disclosure, the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes various media capable of storing program codes, such as, a USB flash drive, a mobile hard disk, a Read Only Memory (ROM), a Random Access Memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video query method, implemented by an electronic device, comprising:
 obtaining a media feature of a query media and a static image feature corresponding to a candidate video, the query media comprising a target object, the candidate video comprising a moving object;
 determining a video feature of the candidate video according to the static image feature and motion time sequence information of the moving object in the candidate video, wherein:
  the video feature comprises sub-features corresponding to n video segments in the candidate video, n being an integer greater than 1; the motion time sequence information reflects motion trends of the moving object between adjacent video segments; and
  a $t^{th}$ video segment corresponds to a $t^{th}$ sub-feature, t being a positive integer greater than 1 and not greater than n, and the $t^{th}$ sub-feature is determined by:
   determining, in the $t^{th}$ video segment, a target motion trend of the moving object from a $(t-1)^{th}$ sub-feature;
   adjusting a target region corresponding to the moving object in a feature plane of the $(t-1)^{t}$ sub-feature according to the target motion trend; and
   determining the $t^{th}$ sub-feature according to the adjusted $(t-1)^{th}$ sub-feature and a static image feature corresponding to the $t^{th}$ video segment; and
 determining, according to the media feature and the video feature, whether the moving object in the candidate video is related to the target object.

2. The method according to claim 1, wherein the adjusting a target region corresponding to the moving object in a feature plane of the $(t-1)^{th}$ sub-feature according to the target motion trend comprises:
 determining a deviation value corresponding to a control point in the target region according to the target motion trend; and
 moving the control point according to the deviation value, and adjusting the target region corresponding to the moving object in the feature plane of the $(t-1)^{th}$ sub-feature based on the moved control point.

3. The method according to claim 1, wherein the determining, according to the media feature and the video feature, whether the moving object in the candidate video is related to the target object comprises:
 determining a target region having an association relationship with the target object in a feature plane of the $t^{th}$ sub-feature;
 determining a region feature corresponding to the target region according to the $t^{th}$ sub-feature; and
 determining, according to the region feature and the media feature, whether the moving object in the $t^{th}$ video segment is related to the target object.

4. The method according to claim 3, wherein the query media is a query video, and the determining, according to the region feature and the media feature, whether the moving object in the $t^{th}$ video segment is related to the target object comprises:
 determining a weight between video frame content in the query video and the target object by using an attention model;
 determining a query video feature of the query video according to the weight; and
 determining, according to the region feature and the query video feature, whether the moving object in the $t^{th}$ video segment is related to the target object.

5. The method according to claim 3, wherein when the moving object in the $t^{th}$ video segment is related to the target object, the method further comprises:
  identifying the target region in the $t^{th}$ video segment of the candidate video.

6. The method according to claim 4, wherein when the moving object in the $t^{th}$ video segment is related to the target object, the method further comprises:
  identifying the target region in the $t^{th}$ video segment of the candidate video.

7. A video query device, comprising a processor and a memory:
  the memory being configured to store program code, and transmit the program code to the processor; and
  the processor being configured to execute the program code to perform:
  obtaining a media feature of a query media and a static image feature corresponding to a candidate video, the query media comprising a target object, the candidate video comprising a moving object;
    determining a video feature of the candidate video according to the static image feature and motion time sequence information of the moving object in the candidate video, wherein:
      the video feature comprises sub-features corresponding to n video segments in the candidate video, n being an integer greater than 1; the motion time sequence information reflects motion trends of the moving object between adjacent video segments; and
      a $t^{th}$ video segment corresponds to a $t^{th}$ sub-feature, t being a positive integer greater than 1 and not greater than n, and the $t^{th}$ sub-feature is determined by:
        determining, in the $t^{th}$ video segment, a target motion trend of the moving object from a $(t-1)^{th}$ sub-feature;
        adjusting a target region corresponding to the moving object in a feature plane of the $(t-1)^t$ sub-feature according to the target motion trend; and
        determining the $t^{th}$ sub-feature according to the adjusted $(t-1)^{th}$ sub-feature and a static image feature corresponding to the $t^{th}$ video segment; and
    determining, according to the media feature and the video feature, whether the moving object in the candidate video is related to the target object.

8. The device according to claim 7, wherein the adjusting a target region corresponding to the moving object in a feature plane of the $(t-1)^{th}$ sub-feature according to the target motion trend comprises:
  determining a deviation value corresponding to a control point in the target region according to the target motion trend; and
  moving the control point according to the deviation value, and adjusting the target region corresponding to the moving object in the feature plane of the $(t-1)^{th}$ sub-feature based on the moved control point.

9. The device according to claim 7, wherein the determining, according to the media feature and the video feature, whether the moving object in the candidate video is related to the target object comprises:
  determining a target region having an association relationship with the target object in a feature plane of the $t^{th}$ sub-feature;
  determining a region feature corresponding to the target region according to the $t^{th}$ sub-feature; and
  determining, according to the region feature and the media feature, whether the moving object in the $t^{th}$ video segment is related to the target object.

10. The device according to claim 9, wherein the query media is a query video, and the determining, according to the region feature and the media feature, whether the moving object in the $t^{th}$ video segment is related to the target object comprises:
  determining a weight between video frame content in the query video and the target object by using an attention model;
  determining a query video feature of the query video according to the weight; and
  determining, according to the region feature and the query video feature, whether the moving object in the $t^{th}$ video segment is related to the target object.

11. The device according to claim 10, wherein when the moving object in the $t^{th}$ video segment is related to the target object, the method further comprises:
  identifying the target region in the $t^{th}$ video segment of the candidate video.

12. The device according to claim 10, wherein when the moving object in the $t^{th}$ video segment is related to the target object, the method further comprises:
  identifying the target region in the $t^{th}$ video segment of the candidate video.

13. A non-transitory computer-readable storage medium, configured to store program code, the program code, when being executed by a processor, causing the processor to perform:
  obtaining a media feature of a query media and a static image feature corresponding to a candidate video, the query media comprising a target object, the candidate video comprising a moving object;
    determining a video feature of the candidate video according to the static image feature and motion time sequence information of the moving object in the candidate video, wherein:
      the video feature comprises sub-features corresponding to n video segments in the candidate video, n being an integer greater than 1; the motion time sequence information reflects motion trends of the moving object between adjacent video segments; and
      a $t^{th}$ video segment corresponds to a $t^{th}$ sub-feature, t being a positive integer greater than 1 and not greater than n, and the $t^{th}$ sub-feature is determined by:
        determining, in the $t^{th}$ video segment, a target motion trend of the moving object from a $(t-1)^{th}$ sub-feature;
        adjusting a target region corresponding to the moving object in a feature plane of the $(t-1)^t$ sub-feature according to the target motion trend; and
        determining the $t^{th}$ sub-feature according to the adjusted $(t-1)^{th}$ sub-feature and a static image feature corresponding to the $t^{th}$ video segment; and
  determining, according to the media feature and the video feature, whether the moving object in the candidate video is related to the target object.

14. The storage medium according to claim 13, wherein the adjusting a target region corresponding to the moving object in a feature plane of the $(t-1)^{th}$ sub-feature according to the target motion trend comprises:
- determining a deviation value corresponding to a control point in the target region according to the target motion trend; and
- moving the control point according to the deviation value, and adjusting the target region corresponding to the moving object in the feature plane of the $(t-1)^{th}$ sub-feature based on the moved control point.

15. The storage medium according to claim 13, wherein the determining, according to the media feature and the video feature, whether the moving object in the candidate video is related to the target object comprises:
- determining a target region having an association relationship with the target object in a feature plane of the $t^{th}$ sub-feature;
- determining a region feature corresponding to the target region according to the $t^{th}$ sub-feature; and
- determining, according to the region feature and the media feature, whether the moving object in the $t^{th}$ video segment is related to the target object.

16. The storage medium according to claim 15, wherein the query media is a query video, and the determining, according to the region feature and the media feature, whether the moving object in the $t^{th}$ video segment is related to the target object comprises:
- determining a weight between video frame content in the query video and the target object by using an attention model;
- determining a query video feature of the query video according to the weight; and
- determining, according to the region feature and the query video feature, whether the moving object in the $t^{th}$ video segment is related to the target object.

17. The storage medium according to claim 16, wherein when the moving object in the $t^{th}$ video segment is related to the target object, the method further comprises:
- identifying the target region in the $t^{th}$ video segment of the candidate video.

* * * * *